May 24, 1960 J. W. HARRIS ET AL 2,937,659
BALL VALVE CAGE
Filed Jan. 9, 1958
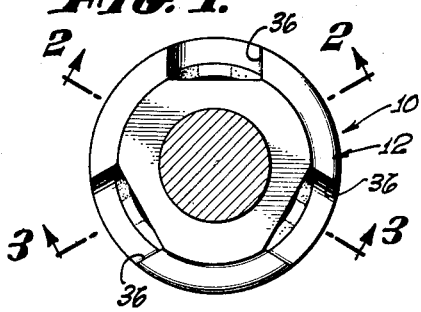
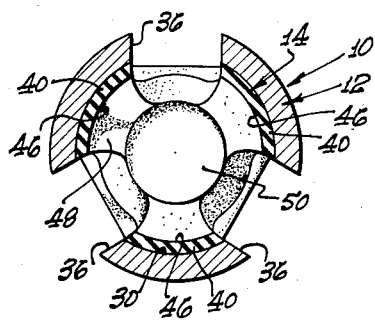
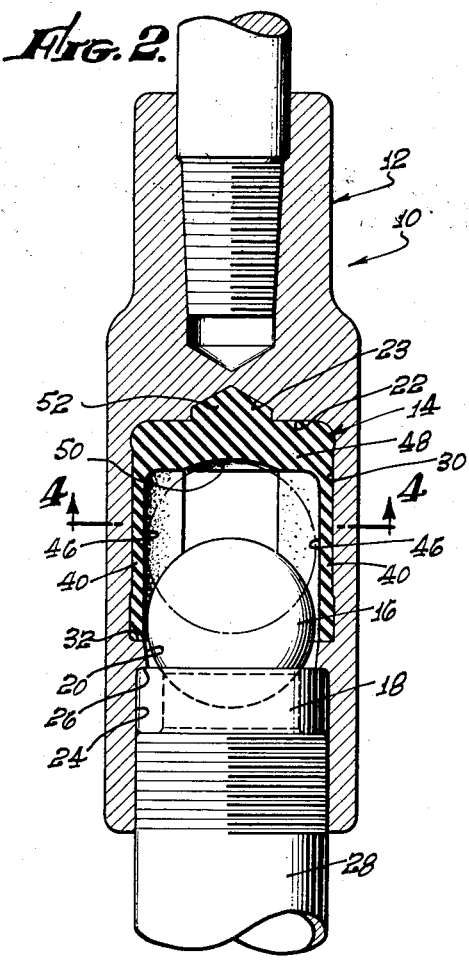
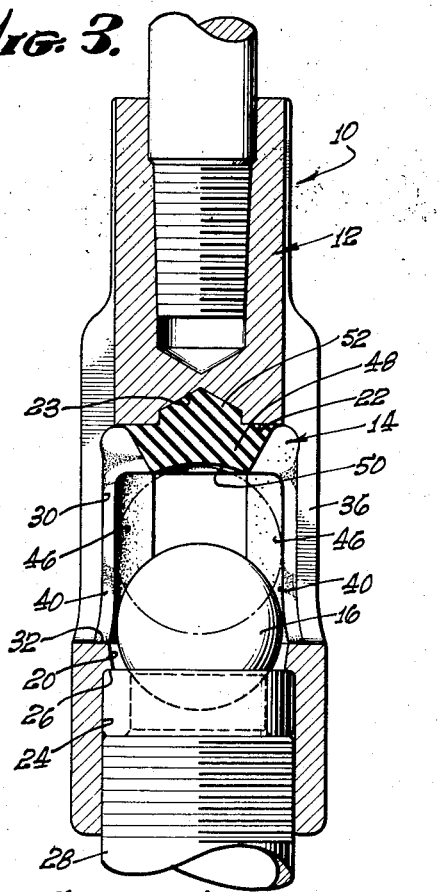
JACOB W. HARRIS,
HOLLIS G. HUBBARD,
INVENTORS.
By Their Attorneys
HARRIS, KIECH, FOSTER & HARRIS.

United States Patent Office 2,937,659
Patented May 24, 1960

2,937,659

BALL VALVE CAGE

Jacob W. Harris, Anaheim, and Hollis G. Hubbard, Downey, Calif., assignors to Dresser Industries, Inc., Dallas, Tex., a corporation of Delaware Filed Jan. 9, 1958, Ser. No. 707,944

5 Claims. (Cl. 137—533.13)

The present invention relates in general to valves and, more particularly, to a ball check valve having a cage which includes a ball guide formed of an elastomeric material, such as rubber, or various synthetic materials having similar physical characteristics. As a matter of convenience, the invention will be considered herein as embodied in a working valve for use with a well pump of the reciprocating type, but it will be understood that the invention is not limited thereto.

Still more particularly, the present invention relates to an elastomeric ball guide which includes improvements on those disclosed and claimed in Patent No. 2,682,281, granted June 29, 1954, to Murry F. Ecker, and in patent application Serial No. 587,019, filed May 24, 1956, by Hollis G. Hubbard, one of the applicants herein, the application now being abandoned. As discussed in detail in the Ecker patent, elastomeric ball guides overcome many disadvantages of metallic ball guides since the material of the former, being elastic, yields when a ball valve comes in contact therewith and then immediately resumes its original configuration. Thus, wear of both the ball valve and the ball guide is minimized and peening thereof is substantially eliminated, which are important features, particularly in valves, such as the working valves of oil well pumps, wherein the ball valve seats and unseats frequently.

The elastomeric ball cages of the Ecker patent and the Hubbard application include two or more circumferentially spaced guide elements having inner, guide surfaces which are segments of cylindrical surfaces extending parallel to the axis of the device, i.e., extending parallel to the path of ball movement toward and away from a valve seat at one end of the guide. The guide elements of the Ecker patent are provided at the ends thereof remote from the valve seat with inwardly converging, transversely spaced abutments to limit movement of the ball valve away from its seat. The guide of the Hubbard application is a substantial improvement on that of the Ecker patent in that it includes a transverse bridge interconnecting and bridging the space between the two or more circumferentially spaced guide elements, this bridge being seated on a bridge seat provided by the housing of the device and serving to prevent wedging of the ball in the guide.

A primary object of the present invention is to provide an elastomeric ball guide of the foregoing nature wherein the bridge includes an elastomeric projection or button fitted into a central, axially directed recess in the bridge seat, such recess facing the valve seat. Since the engagement between the ball valve and the bridge occurs primarily at the center of the bridge, i.e., in the vicinity of the axis of the device, this button serves to back up the bridge in absorbing impacts due to impingement by the ball. Consequently, the thickness, i.e., axial dimension, of the bridge may be reduced materially. This has the effect of reducing the over-all length of the device, which is an important feature since it permits correspondingly greater pump-plunger travel in an oil well pump, for example.

Since the aforementioned elastomeric button, being seated in a recess in the bridge seat, has a retaining effect on the entire elastomeric ball guide tending to hold it in place in the housing, the outer retaining annulus with which the ball guides of the Ecker patent and the Hubbard application are provided may be omitted, which is an important feature also.

The foregoing objects, features, advantages, and results of the present invention, together with various other objects, features, advantages and results thereof which will be evident to those skilled in this art in the light of the present disclosure, may be attained with the exemplary embodiment of the invention illustrated in the accompanying drawing and described in detail hereinafter. Referring to the drawing:

Fig. 1 is an end view of a check valve which embodies the invention;

Figs. 2 and 3 are longitudinal sectional views thereof respectively taken along the irregular arrowed lines 2—2 and 3—3 of Fig. 1; and Fig. 4 is a transverse sectional view taken along the arrowed line 4—4 of Fig. 2.

In the drawing, the numeral 10 designates generally a check valve which embodies the invention and which may be employed in connection with any desired apparatus. For example, the check valve 10 may be utilized as the working valve of an oil well pump.

The valve 10 includes, in general, a cage body or housing 12 having therein an elastomeric ball cage or guide 14 for a ball valve 16 which is engageable with an annular valve seat 18 to prevent flow through the device in one direction.

The housing 12 is provided with an axial bore 20 therein which terminates in an end wall 22 facing the valve seat 18, this end wall being termed a bridge seat hereinafter for reasons which will become apparent. The bridge seat 22 is provided with a central recess 23 which faces the valve seat 18, this recess being generally cylindrical in the construction illustrated and having an inner wall which converges axially away from the valve seat to provide the recess with a maximum depth at its center.

The valve seat 18 comprises an annulus disposed in a counterbore 24 in the housing 12 and seated against an annular shoulder 26 at the junction of this counterbore with the bore 20, the valve seat being retained in the counterbore 24 by a tubular member 28 threaded thereinto.

The housing 12 is provided with an annular recess 30 therein which constitutes an annular enlargement of the bore 20 and which receives the elastomeric ball guide 14. The housing 12 is also provided with an annular shoulder 32 therein at the junction of the bore 20 and one end of the annular recess 30. Further, the housing 12 is provided with window-like ports 36 therein which extend radially through the peripheral wall of the annular recess 30 so that fluid entering the housing 12 through the tubular member 28 may flow through the annular valve seat 18 into the bore 20 when the ball valve 16 is unseated, and may flow from such bore through the ports 36.

The elastomeric ball guide 14 is of one-piece construction and includes, in the particular embodiment illustrated, three circumferentially spaced guide elements 40 located in the annular recess 30 between the window-like ports 36 and seated on the annular shoulder 32. The guide elements 40 are provided with inner, guide surfaces 46 which have the form of segments of cylindrical surfaces parallel to the axis of the device. In other words, the guide surfaces 46 are circularly arcuate in planes perpendicular to the axis, the curvature of the guide surfaces conforming substantially to that of the ball valve 16.

The ball guide 14 also includes a bridge 48 seated against and backed up by the bridge seat 22 formed by the end wall of the bore 20, this bridge extending transversely between and interconnecting the guide elements 40. The bridge 48 is provided with a surface 50 which faces the valve seat 18 and which is a segment of a spherical surface substantially conforming in curvature to the ball valve 16 and faired into the cylindrical guide surfaces 46. In other words, the bridge surface 50 is circularly arcuate in a plane containing the axis of the housing 12, and is circularly arcuate in a plane perpendicular to the axis.

Integral with the bridge 48 and fitting into and filling the recess 23 is a projection or button 52. It will be noted that this button is on the axis of the device and has its maximum axial dimension on the axis.

In operation, as the ball valve 16 moves between its closed and open positions, respectively shown in solid and broken lines in Figs. 2 and 3 of the drawing, it is guided by the cylindrical guide surfaces 46 on the guide elements 40 of the cage or guide 14. Movement of the ball valve 16 away from the valve seat 18 is limited in a positive, yet yieldingly resilient, manner by the bridge 48, which is complementary in configuration to the ball valve. Since the bridge 48 is backed up by the portion of the housing 12 forming the bridge seat 22, the bridge can yield resiliently only in compression in response to impact by the ball valve 16. Thus, with this construction, it is impossible for the ball valve 16 to become wedged between the guide elements 40 due to the positive stop provided by the bridge 48, the resiliently yieldable nature of the bridge minimizing wear and substantially eliminating peening of the ball valve despite repeated contact.

It will be noted that the button 52 in effect forms an extension of the bridge 48 at the center of the bridge, i.e., in the area of contact between the ball valve 16 and the bridge. Thus, the button 52 also yields resiliently in compression in response to impact by the ball valve 16, and therefore has the effect of increasing the effective axial dimension of the bridge. However, because of the presence of the button 52, the axial dimension of the bridge 48 itself may be reduced materially since the button takes over part of the function of the bridge. Consequently, the over-all axial length of the ball guide 14 is less than would otherwise be the case, which permits a reduction in the over-all length of the check valve 10. This is particularly important when the check valve 10 is utilized as the working valve of an oil well pump since, by reducing the over-all length of the check valve, the stroke of the pump plunger can be correspondingly increased.

Since the ball guide 14 is formed of an elastomeric material, it is sufficiently flexible that it may be deformed readily for installation in and removal from the annular recess 30 and the axial recess 23 through the bore 20. Thus, the ball guide may be a separate part of one-piece construction. Alternatively, the elastomeric ball guide 14 may be molded in place in the housing 12 and bonded thereto.

Preferably, the elastomeric material of which the ball guide or cage 14 is formed is relatively hard and abrasion resistant to minimize wear. A wide variety of elastomeric materials suitable for the ball guide 14 is available, examples being found in the aforementioned Ecker patent.

Although an exemplary embodiment of the invention has been disclosed herein for purposes of illustration, it will be understood that various changes, modifications and substitutions may be incorporated in the embodiment disclosed without departing from the spirit of the invention as defined by the claims which follow.

We claim:

1. In a valve, the combination of: a housing having a central, axially directed recess; a valve seat in said housing in axial alignment with said recess; a ball guide in said housing in axial alignment with and between said valve seat and said recess and including at least two elastomeric guide elements, said guide elements being spaced apart circumferentially of said housing and being provided with inner, guide surfaces which are arcuate in a plane perpendicular to the axis of said housing, said ball guide also including an elastomeric bridge extending transversely of said housing between said guide elements and having a central bridge surface facing axially of said housing toward said valve seat, said ball guide further including an elastomeric projection carried by said bridge and disposed in said recess and keying said bridge against lateral movement relative to said housing; and a ball valve in said guide between said guide surfaces and movable axially of said housing between said valve seat and said bridge surface.

2. In a valve, the combination of: a housing provided with a transverse bridge seat having a central, axially directed recess therein; a valve seat in said housing spaced axially from and facing said bridge seat; a ball guide in said housing between said valve seat and said bridge seat, said ball guide including at least two elastomeric guide elements provided with inner, guide surfaces which are segments of cylindrical surfaces and which are parallel to the axis of said housing, said ball guide also including an elastomeric bridge extending transversely of said housing between said guide elements and seated on said bridge seat, said bridge having a central bridge surface facing axially of said housing toward said valve seat, said ball guide further including an elastomeric projection carried by said bridge and disposed in said recess and keying said bridge against lateral movement relative to said housing; and a ball valve in said guide between said guide surfaces and movable axially of said housing between said valve seat and said bridge surface.

3. In a valve, the combination of: a housing provided with a transverse bridge seat having a central, axially directed recess therein; a valve seat in said housing spaced axially from and facing said bridge seat; a ball guide in said housing between said valve seat and said bridge seat, said ball guide including at least two elastomeric guide elements provided with inner, guide surfaces which are segments of cylindrical surfaces and which are parallel to the axis of said housing, said ball guide also including an elastomeric bridge extending transversely of said housing between said guide elements and seated on said bridge seat, said bridge having a central bridge surface which is a segment of a spherical surface and which faces axially of said housing toward said valve seat, said ball guide further including an elastomeric projection carried by said bridge and disposed in said recess and keying said bridge against lateral movement relative to said housing; and a ball valve in said guide between said guide surfaces and movable axially of said housing between said valve seat and said bridge surface.

4. In a valve, the combination of: a housing provided with a transverse bridge seat having a central, axially directed recess therein; a valve seat in said housing and spaced axially from and facing said bridge seat; a one-piece elastomeric ball guide in said housing between said bridge and valve seats, said ball guide including elastomeric cylindrical guide surfaces parallel to the axis of said housing and including an elastomeric transverse bridge on said bridge seat and having a central bridge surface which faces axially of said housing toward said valve seat and which is a segment of a spherical surface, said ball guide further including an elastomeric projection carried by said bridge and disposed in said recess and keying said bridge against lateral movement relative to said housing; and a ball valve in said guide between said guide surfaces and movable axially of said housing between said valve seat and said bridge surface.

5. A one-piece elastomeric ball guide having an axis and including at least two elastomeric guide elements radially spaced from said axis and circumferentially spaced apart about said axis, said guide elements having inner, guide surfaces which are segments of cylindrical surfaces parallel to said axis, said ball guide also including an elastomeric bridge extending transversely of said ball guide and interconnecting said guide elements at one end of said ball guide, said bridge having a central bridge surface which faces axially toward the other end of said ball guide and which is engageable by a ball valve, said ball guide further including a central elastomeric projection integral with said bridge and extending axially therefrom on the opposite side of said bridge from said bridge surface.

References Cited in the file of this patent

UNITED STATES PATENTS

| | | |
|---|---|---|
| 1,001,246 | Budlong | Aug. 22, 1911 |
| 2,192,425 | Allen et al. | Mar. 5, 1940 |